US010060447B2

(12) United States Patent
Nelson et al.

(10) Patent No.: US 10,060,447 B2
(45) Date of Patent: Aug. 28, 2018

(54) HORIZONTAL PUMPING SYSTEM WITH BENT PLATE FRAME

(71) Applicant: GE Oil & Gas ESP, Inc., Oklahoma City, OK (US)

(72) Inventors: Andrew Michael Nelson, Oklahoma City, OK (US); Jonathan Edward Peterson, Oklahoma City, OK (US); Christina Collins, Oklahoma City, OK (US); William Sparkes, Oklahoma City, OK (US)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 0 days.

(21) Appl. No.: 15/443,834

(22) Filed: Feb. 27, 2017

(65) Prior Publication Data

US 2017/0167512 A1 Jun. 15, 2017

Related U.S. Application Data

(63) Continuation-in-part of application No. 14/044,609, filed on Oct. 2, 2013, now Pat. No. 9,581,175.

(51) Int. Cl.

*F04D 29/00* (2006.01)
*F04D 29/60* (2006.01)
*F04D 13/06* (2006.01)
*F04D 29/02* (2006.01)

(52) U.S. Cl.

CPC .......... *F04D 29/605* (2013.01); *F04D 13/06* (2013.01); *F04D 29/026* (2013.01)

(58) Field of Classification Search

CPC ....... F04D 29/605; F04D 13/06; F04D 29/026
See application file for complete search history.

(56) References Cited

U.S. PATENT DOCUMENTS 3,652,044 A * 3/1972 Manross .................. F16M 7/00 248/657
4,120,210 A * 10/1978 Sloyan ..................... F16M 7/00 248/657

* cited by examiner

*Primary Examiner* — Anita M King
(74) *Attorney, Agent, or Firm* — Crowe & Dunlevy, P.C.

(57) ABSTRACT

A pumping system frame assembly for use in supporting a horizontal pumping system on a platform includes a central body assembly, a motor plate connected to the central body assembly and a plurality of platform support assemblies connected to the central support member. The central body assembly includes a central support member that has an upper face and a pair of side rails connected to the upper face. A central brace extends along at least a portion of the central support member.

18 Claims, 5 Drawing Sheets

100 134 104 102 132 108 106 110 122 110 116 114 132

128 124 136 126

HORIZONTAL PUMPING SYSTEM WITH BENT PLATE FRAME

RELATED APPLICATIONS

This application is a continuation-in-part of U.S. patent application Ser. No. 14/044,609, entitled "Horizontal Pumping System with Bent Plate Frame," which was filed on Oct. 2, 2013 and which issued as U.S. Pat. No. 9,581,175 on Feb. 28, 2017, the disclosure of which is herein incorporated by reference.

FIELD OF THE INVENTION

This invention relates generally to the field of horizontal pumping systems, and more particularly to an improved frame for supporting a horizontal pumping system.

BACKGROUND

Horizontal pumping systems are used in various industries for various purposes. For example, in the oil and gas industry horizontal pumping systems are used to pump fluids, such as water separated from oil, to a selected destination, such as a tank or disposal well. Typically these horizontal pumping systems include a pump, a motor, and a suction chamber positioned between the pump and the motor. Often a thrust bearing chamber is also included between the motor and the suction chamber.

Each of these components is typically supported on the surface by one or more large frames. Specialized adapters have been used to connect the components of the horizontal pumping system to the frame. These adapters would match the frame to the motor plate and raise the motor into proper alignment with the pump. Prior art frames are designed for use with a wide range of motors, so these frames are often larger, heavier, and more expensive than required for applications involving smaller pumps and motors.

In view of these and other shortcomings in the prior art, there is a need from an improved system for supporting and aligning horizontal pumping systems. It is to these and other deficiencies in the prior art that the present invention is directed.

SUMMARY OF THE INVENTION

In one aspect, the present invention includes a pumping system frame assembly for use in supporting a horizontal pumping system on a platform. The pumping system frame assembly includes a central body assembly, a motor plate connected to the central body assembly and a plurality of platform support assemblies connected to the central support member. The central body assembly includes a central support member that has an upper face and a pair of side rails connected to the upper face. A central brace extends along at least a portion of the central support member.

DETAILED DESCRIPTION OF THE EMBODIMENTS

Figure 1:
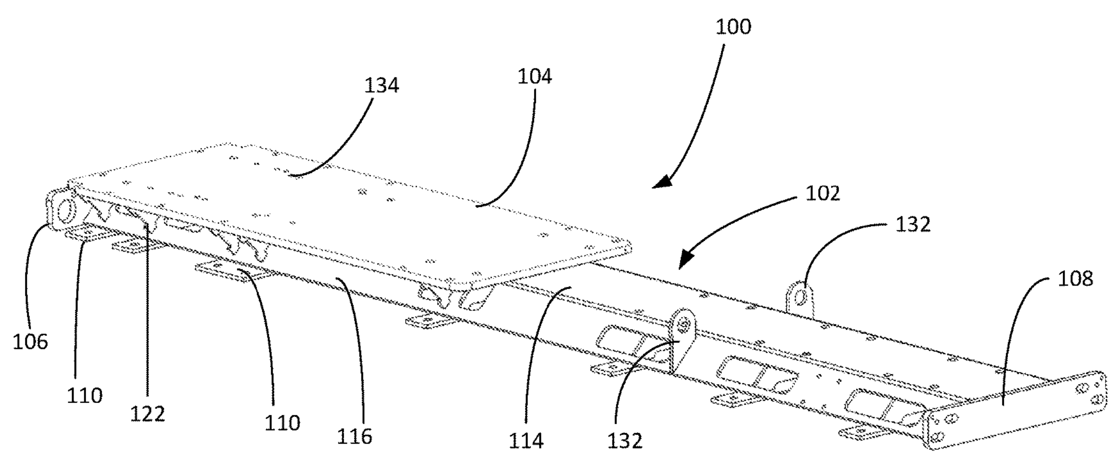
FIG. 1 is a perspective view of the pumping system frame constructed in accordance with an exemplary embodiment.

Referring to FIG. 1, shown therein is a perspective view of a pumping system frame assembly 100 constructed in accordance with an exemplary embodiment. The pumping system frame assembly 100 generally includes a central body assembly 102, a motor plate 104, a proximal end plate 106, a distal end plate 108, a plurality of platform support assemblies 110. It will be appreciated that the pumping system frame assembly 100 is configured to support a horizontal pumping system (not shown) that includes an electric motor, a pump assembly, an intake and a thrust chamber. For the purposes of this disclosure, the pumping system frame assembly 100 will be described as having a proximal end adjacent the motor plate 104 and a distal end adjacent the opposite end of the central body assembly 102. The distal end plate 108 is secured by welding or other means to the distal end of the central body assembly 102. The proximal end plate 106 is fixed to the proximal end of the central body assembly 102 and the motor plate 104. Unless otherwise indicated, each of the components of the pumping system frame assembly 100 is constructed from steel or another metal or metal alloy.

Figure 2:
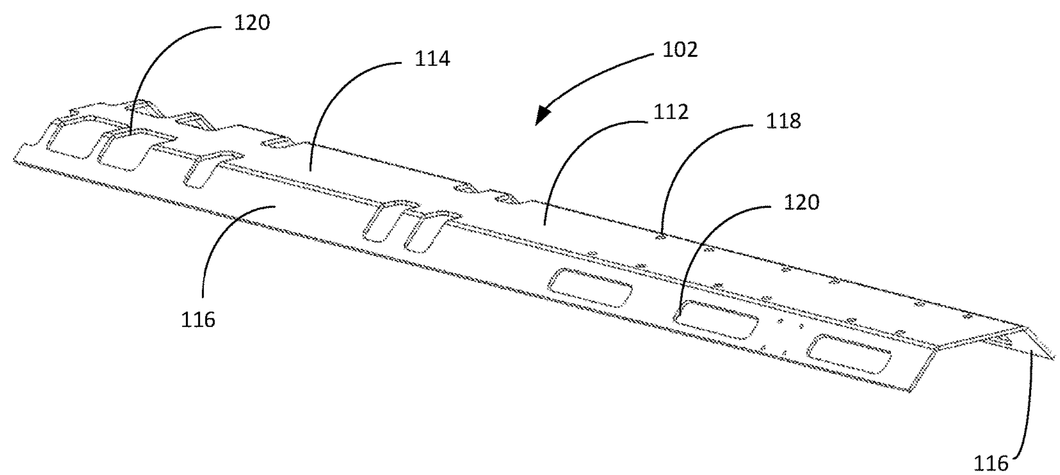
FIG. 2 is a perspective view of the central support member of the pumping system frame of FIG. 1.
Figure 8:
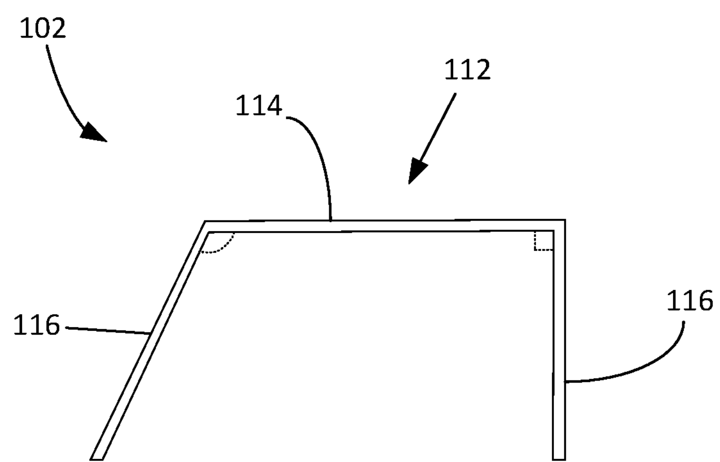
FIG. 8 is a view of the proximal end of an alternative embodiment of the pumping system of FIG. 2.

As shown in FIG. 2, the central body assembly 102 includes a central support member 112. The central support member 112 includes an upper face 114 and a pair of angular side rails 116. In one embodiment, the upper face 114 and angular side rails 116 are formed by bending a unitary piece using a suitable brake or press. In an alternative embodiment, the upper face 114 and side rails 116 are initially manufactured as individual pieces that are fastened together at the desired angle using welding or other manufacturing techniques. The interior angle between each of the side rails 116 and the upper face 114 is between about 15 and 75 degrees. In some embodiments, the interior angle between each of the side rails 116 and the upper face 114 is about 45 degrees (as depicted in FIG. 2). In yet other embodiments, each of the pair of side rails 116 is connected to the upper face 114 at different angles (as depicted in FIG. 8).

Continuing with FIG. 2, it will be noted that the central support member 112 includes a number of bores 118 and cut-outs 120 that are configured to permit the facilitated attachment of components of the horizontal pumping system. The bores 118 and cut-outs 120 are strategically placed to accommodate fasteners, lighten the central support member 112 without compromising the rigidity and strength of the pumping system frame assembly 100. The use of a unitary or unified central support member 112 with angled sides provides a structurally rigid base that is significantly lighter and less expensive than conventional support frames fabricated with structural steel.

Figure 3:
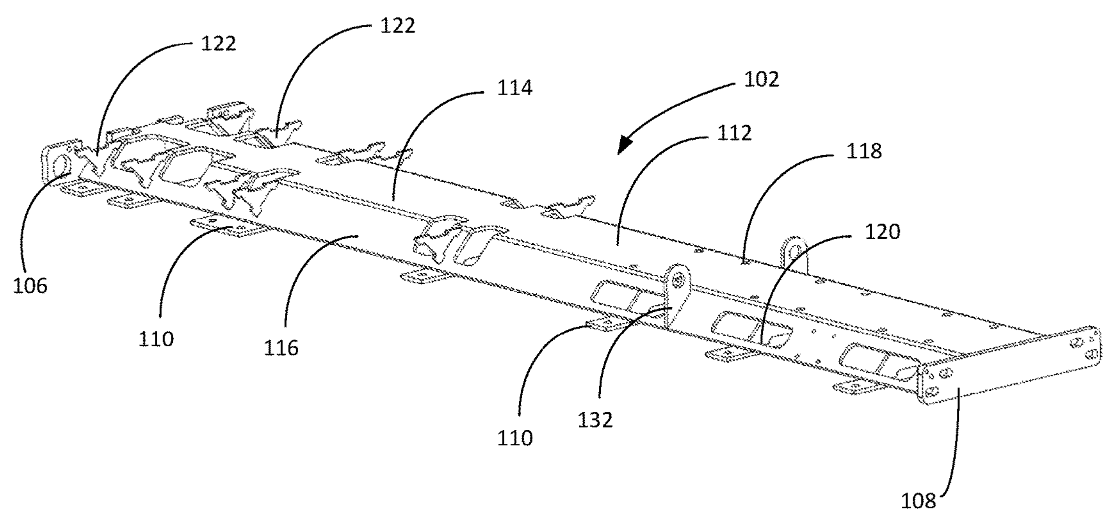
FIG. 3 is a perspective view of the pumping system frame of FIG. 1 with the motor plate removed.

Turning to FIG. 3, shown therein is a perspective view of the pumping system frame assembly 100 with the motor plate 104 removed to reveal otherwise obscured components. In particular, the central body assembly 102 includes a plurality of gussets 122 fixed to the side rails 116 along the proximal portion of the central support member 112. The gussets 122 are configured for connection to the underside of the motor plate 104 to better transfer loads from the motor plate into the central support member 112.

Figure 4:
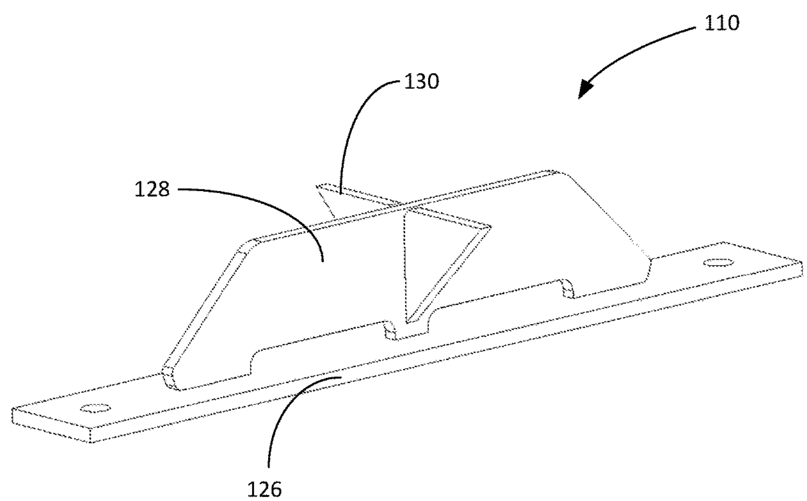
FIG. 4 is a perspective view of a support assembly from the pumping system frame of FIG. 1.

The central body assembly 102 is supported on a pad or platform by the plurality of platform support assemblies 110. The plurality of platform support assemblies 110 are distributed along the length of the central support member 112. A perspective depiction of a single platform support assembly 110 is shown in FIG. 4. Each platform support assembly 110 includes a base 126, a lateral brace 128 and a longitudinal brace 130. The base 126 includes angled ends that are configured to match the interior angle between the upper face 114 and the side rails 116. The lateral brace 128 can be welded along the underside of the upper face 114 and the side rails 116. In this way, the lateral brace 128 stiffens the central support member 112 and transfers loads into the base 126. The longitudinal brace 130 is welded to the underside of the upper face 114 and the vertical portions of the lateral brace 128 to oppose movement along the longitudinal axis of the central support member 112.

The central body assembly 102 also includes a plurality of lifting lugs 132 fixed to the side rails 116. The lifting lugs 132, proximal end plate 106 and distal end plate 108 can be used with conventional hoists to lift and position the pumping system frame assembly 100 and horizontal pumping system.

Figure 5:
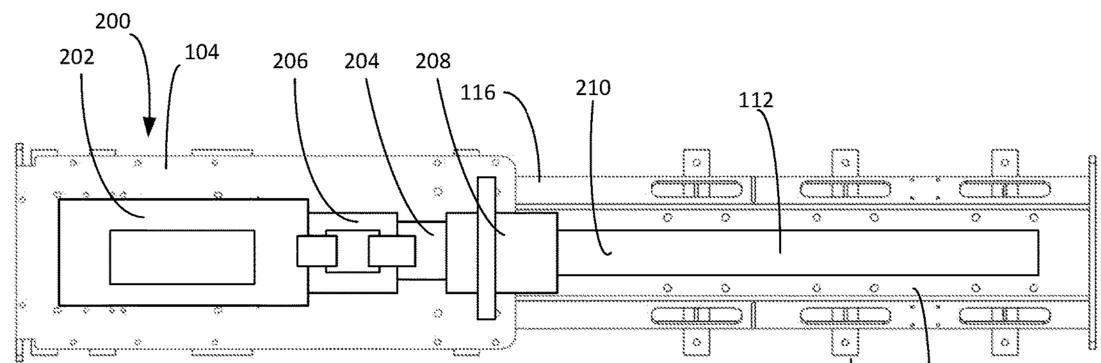
FIG. 5 is a top plan view of the pumping system frame of FIG. 1.
Figure 6:
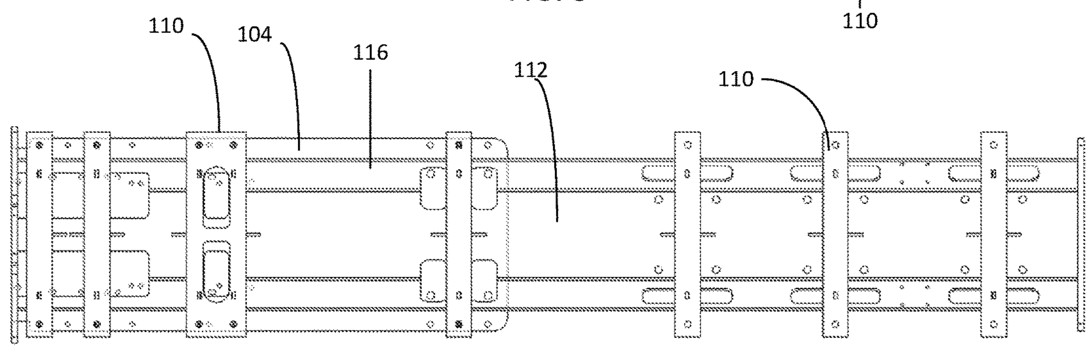
FIG. 6 is a bottom view of the pumping system frame of FIG. 1.
Figure 7:
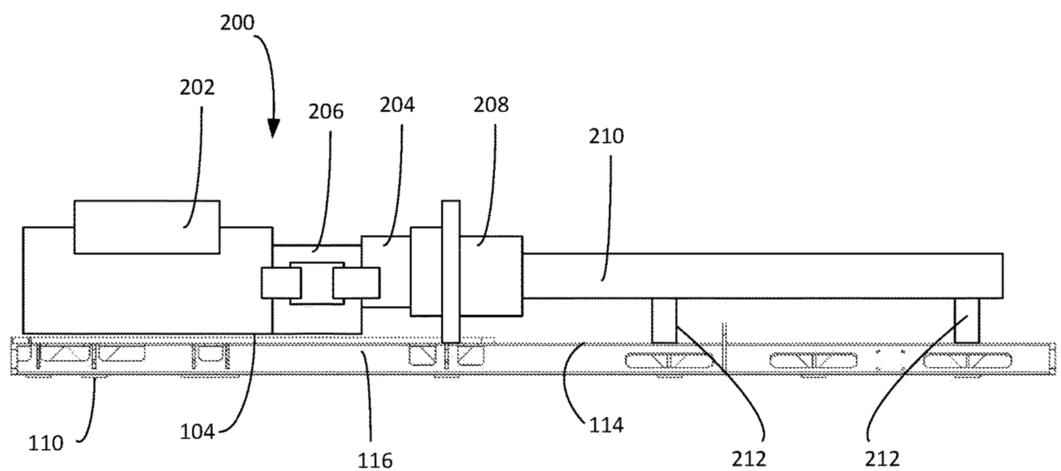
FIG. 7 is a side view of the pumping system frame of FIG. 1.

Turning to FIGS. 5-7, shown therein are top plan, bottom and side elevational views, respectively, of the pumping system frame assembly 100 supporting a horizontal pumping system 200. The horizontal pumping system 200 includes a motor 202, a thrust chamber 204, a motor coupling 206, a suction chamber 208, a pump assembly 210 and a plurality of pump supports 212. The central support member 112 includes mounting points to support the thrust chamber 204, suction chamber 208, motor coupling 206, the pump assembly 210 and other components from the horizontal pumping system 200. In some embodiments, the motor 202 is an electric motor that includes ball bearings and the central support member 112 includes a final bent width that is wide enough to support the distributed ball load area of the motor ball bearings to ensure proper support foundation and reduced vibration. As noted in these drawings, the platform support assemblies 110 may vary in width. The pumping system frame assembly 100 includes integrated grounding lugs. The motor plate 104 includes mounting holes 134 that are configured to provide attachment points for a wide range of electric motors manufactured according to NEMA, IEC and non-standard motors.

Figure 9:
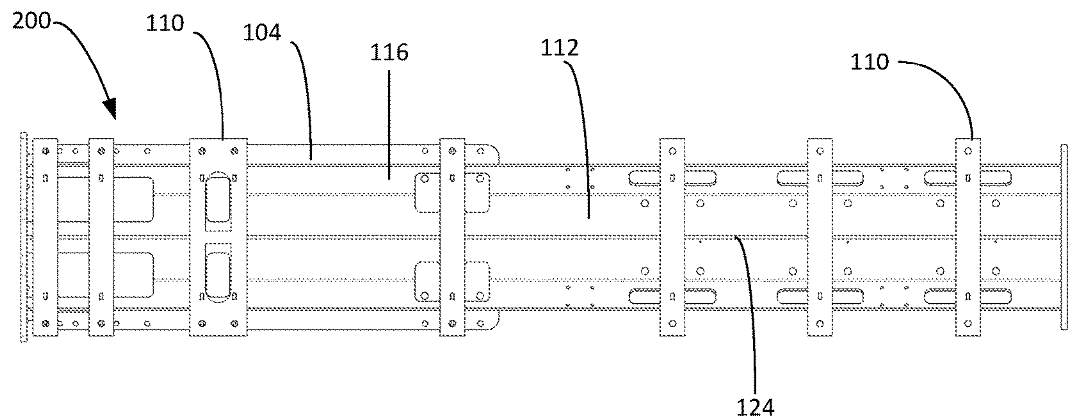
FIG. 9 is a bottom view of an alternate embodiment of the pumping system frame.

Turning to FIG. 9, shown therein is a bottom view of the pumping system frame assembly 100 constructed in accordance with a second embodiment. In the embodiment depicted in FIG. 9, the central body assembly 102 includes a central brace 124. The central brace 124 extends along the underside of the central support member 112. The central brace 124 may extend along the entire length of the central support member 112 (as shown in FIG. 9) or the central brace 124 may extend along only a portion of the central support member 112. The central brace 124 provides increased stiffness and rigidity to the central support member 112.

Figure 10:
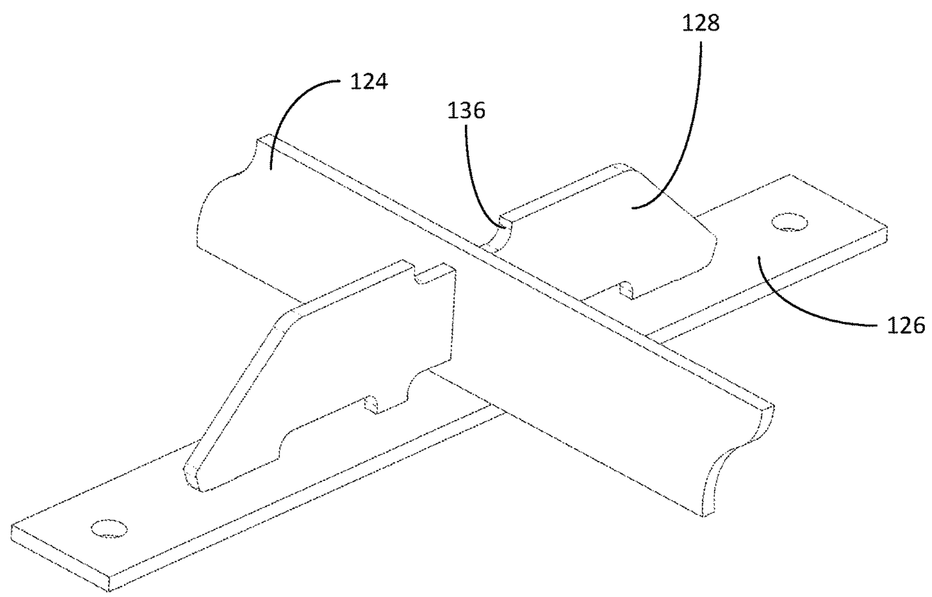
FIG. 10 is a perspective view of a support assembly from the pumping system frame of FIG. 9.

To accommodate the central brace 124, the platform support assemblies 110 must be modified. As shown in FIG. 10, the longitudinal braces 130 have been removed and a notch 136 has been incorporated into the lateral brace 128 to accept the central stiffener 124 (a portion of which is shown in FIG. 10).

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A pumping system frame assembly for use in supporting a horizontal pumping system on a platform, the pumping system frame assembly comprising:

- a central body assembly, wherein the central body assembly comprises:
  - a central support member, wherein the central support member comprises:
    - an upper face; and
    - a pair of side rails connected to the upper face;
- a motor plate connected to the central body assembly;
- a plurality of platform support assemblies connected to the central support member; and
- a central brace, wherein the central brace extends along the entire length of the bottom of the central support member.

2. The pumping system frame assembly of claim 1, wherein each of the pair of side rails is connected to the upper face at an angle.

3. The pumping system frame assembly of claim 1, wherein each of the pair of side rails is connected to the upper face to form an interior angle beneath the upper face, wherein the interior angle between each of the side rails and the upper face is between about 15 and 75 degrees.

4. The pumping system frame assembly of claim 3, wherein the interior angle between each of the side rails and the upper face is about 45 degrees.

5. The pumping system frame assembly of claim 1, wherein each of the pair of side rails is connected to the upper face at different interior angles beneath the upper face.

6. The pumping system frame assembly of claim 1, wherein the central body assembly further comprises a plurality of gussets between the central support member and the motor plate.

7. The pumping system frame assembly of claim 1, wherein each of the platform support assemblies comprises:

- a base; and
- a lateral brace connected to the base, wherein the lateral brace is also connected to the underside of the upper face and each of the pair of side rails.

8. The pumping system frame assembly of claim 7, wherein each of the platform support assemblies further comprises a notch to accommodate the central brace.

9. The pumping system frame assembly of claim 1 further comprising:

- a proximal end plate connected to the central support member adjacent the motor plate; and
- a distal end plate connected to the opposite end of the central support member.

10. The pumping system frame assembly of claim 9, wherein the central body assembly further comprises a plurality of lifting lugs connected to the central support member.

11. A horizontal pumping system, the horizontal pumping system comprising:

a pumping system frame assembly for use in supporting the horizontal pumping system on a platform, the pumping system frame assembly comprising:

a central body assembly, wherein the central body assembly comprises:

a central support member having an upper face, a bottom and a pair of side rails connected to the upper face;

a motor plate connected to the central body assembly; and a central brace connected to the bottom of the central support member; and a plurality of platform support assemblies connected to the central support member; and an electric motor supported by the motor plate; and a pump assembly connected to the upper face of the central support member.

12. The horizontal pumping system of claim 11, further comprising a thrust chamber connected to the electric motor, wherein the thrust chamber is connected to the central support member.

13. The horizontal pumping system of claim 12, further comprising a suction chamber connected to the pump assembly and the thrust section, wherein the suction chamber is supported by the central support member.

14. The horizontal pumping system of claim 13, wherein each of the pair of side rails is connected to the upper face to form an interior angle beneath the upper face, wherein the interior angle between each of the side rails and the upper face is between about 15 and 75 degrees.

15. The horizontal pumping system of claim 14, wherein the interior angle between each of the side rails and the upper face is about 45 degrees.

16. The horizontal pumping system of claim 11, wherein the central body assembly further comprises a plurality of gussets between the central support member and the motor plate.

17. The horizontal pumping system of claim 16, wherein each of the platform support assemblies comprises:

a base; and a lateral brace connected to the base, wherein the lateral brace is also connected to the underside of the upper face and each of the pair of side rails.

18. A horizontal pumping system, the horizontal pumping system comprising:

a pumping system frame assembly for use in supporting the horizontal pumping system on a platform, the pumping system frame assembly comprising:

a central body assembly, wherein the central body assembly comprises:

a central support member having an upper face, a bottom, and a pair of side rails connected to the upper face to form an interior angle of about 45 degrees;

a central brace connected to the bottom of the central support member; and a motor plate connected to the central body assembly; and a plurality of platform support assemblies connected to the upper face and each of the pair of side rails of the central support member; and an electric motor supported by the motor plate; and a pump assembly connected to the upper face of the central support member.

* * * * *